United States Patent
Radel et al.

(10) Patent No.: US 11,131,783 B2
(45) Date of Patent: Sep. 28, 2021

(54) NEUTRON IMAGING SYSTEMS AND METHODS

(71) Applicant: PHOENIX NEUTRON IMAGING LLC, Monona, WI (US)

(72) Inventors: Ross Radel, Madison, WI (US); Evan Sengbusch, Madison, WI (US); Michael Taylor, Madison, WI (US); Christopher M. Seyfert, Madison, WI (US); Eli Moll, Madison, WI (US); Lucas Jacobson, Madison, WI (US)

(73) Assignee: PHOENIX NEUTRON IMAGING LLC, Monona, WI (US)

( * ) Notice: Subject to any disclaimer, the term of this patent is extended or adjusted under 35 U.S.C. 154(b) by 0 days.

(21) Appl. No.: 16/381,856

(22) Filed: Apr. 11, 2019

(65) Prior Publication Data
US 2019/0317229 A1    Oct. 17, 2019

Related U.S. Application Data

(60) Provisional application No. 62/655,928, filed on Apr. 11, 2018.

(51) Int. Cl.
*G01T 3/00*     (2006.01)
*H05H 3/06*     (2006.01)

(52) U.S. Cl.
CPC ............. *G01T 3/00* (2013.01); *H05H 3/06* (2013.01)

(58) Field of Classification Search
CPC ..................... G01T 3/00; H05H 3/06
See application file for complete search history.

(56) References Cited

U.S. PATENT DOCUMENTS

| | | | | |
|---|---|---|---|---|
| 3,914,612 A | * | 10/1975 | Cason, Jr. | G21G 4/02 376/343 |
| 4,507,553 A | * | 3/1985 | Oliver | G01V 5/101 250/269.6 |
| 4,599,515 A | * | 7/1986 | Whittemore | G21K 1/00 250/390.1 |
| 5,028,789 A | * | 7/1991 | Whittemore | G01N 23/05 250/390.02 |
| 5,076,993 A | * | 12/1991 | Sawa | G01V 5/0069 376/159 |

(Continued)

FOREIGN PATENT DOCUMENTS

WO    WO 2019/200130    10/2019

OTHER PUBLICATIONS

International Search Report of related PCT/US2019/027028, dated Aug. 9, 2019, 22 pages.

(Continued)

*Primary Examiner* — Blake C Riddick
(74) *Attorney, Agent, or Firm* — Casimir Jones, S.C.; Brian F. Bradley

(57) ABSTRACT

Provided herein are neutron imaging systems (e.g., radiography and tomography) systems and methods that provide, for example, high-quality, high throughput 2D and 3D fast or thermal neutron and/or X-ray images. Such systems and methods find use for the commercial-scale imaging of industrial components. In certain embodiments, provided herein are system comprising a plurality of independent neutron absorber-lined collimators (e.g., 4 or more collimators) extending outwards from a central neutron source assembly.

20 Claims, 11 Drawing Sheets

(56) References Cited

U.S. PATENT DOCUMENTS

| | | | |
|---|---|---|---|
| 6,670,994 B2 | 12/2003 | Voltz et al. | |
| 6,870,894 B2* | 3/2005 | Leung | H05H 3/06 |
| | | | 250/390.04 |
| 7,441,953 B2* | 10/2008 | Banks | A61B 5/1038 |
| | | | 378/197 |
| 7,582,880 B2* | 9/2009 | Wallace | G01T 3/06 |
| | | | 250/390.11 |
| 8,837,662 B2* | 9/2014 | Piefer | G21G 1/10 |
| | | | 376/190 |
| 9,024,261 B2* | 5/2015 | Piefer | G01V 5/0091 |
| | | | 250/358.1 |
| 9,316,760 B2* | 4/2016 | Bendahan | G01V 5/0025 |
| 2003/0178574 A1* | 9/2003 | Wallace | G01T 3/06 |
| | | | 250/390.11 |
| 2004/0022341 A1* | 2/2004 | Leung | H05H 3/06 |
| | | | 376/144 |
| 2006/0023828 A1* | 2/2006 | McGregor | G01T 3/00 |
| | | | 376/158 |
| 2008/0037701 A1* | 2/2008 | Banks | A61B 6/4452 |
| | | | 378/11 |
| 2010/0061500 A1* | 3/2010 | Lou | H05H 6/00 |
| | | | 376/114 |
| 2010/0284502 A1* | 11/2010 | Piefer | G21G 1/10 |
| | | | 376/190 |
| 2011/0096887 A1* | 4/2011 | Piefer | G21B 1/01 |
| | | | 376/193 |
| 2012/0148134 A1* | 6/2012 | McRae | A61B 6/037 |
| | | | 382/131 |
| 2012/0286164 A1* | 11/2012 | Piefer | G01V 5/0091 |
| | | | 250/358.1 |
| 2012/0300890 A1* | 11/2012 | Piefer | G21G 1/08 |
| | | | 376/158 |
| 2013/0341519 A1* | 12/2013 | Li | G01T 3/06 |
| | | | 250/368 |
| 2015/0247947 A1* | 9/2015 | Bendahan | G01V 5/0008 |
| | | | 378/57 |
| 2016/0042826 A1* | 2/2016 | Baldasaro | G21G 1/06 |
| | | | 376/186 |
| 2016/0163495 A1* | 6/2016 | Sherman | H01J 27/024 |
| | | | 315/111.81 |

OTHER PUBLICATIONS

Standard Test Method for Determining Image Quality in Direct Thermal Neutron Radiographic Examination, ASTM International, Designation: E545-14, Jun. 20, 2014, 5 pages.

Standard Test Method for the L/D Ratio of Neutron Radiography Beams, ASTM International, Designation: E803-17, at least as early as Dec. 31, 2017, 7 pages.

* cited by examiner

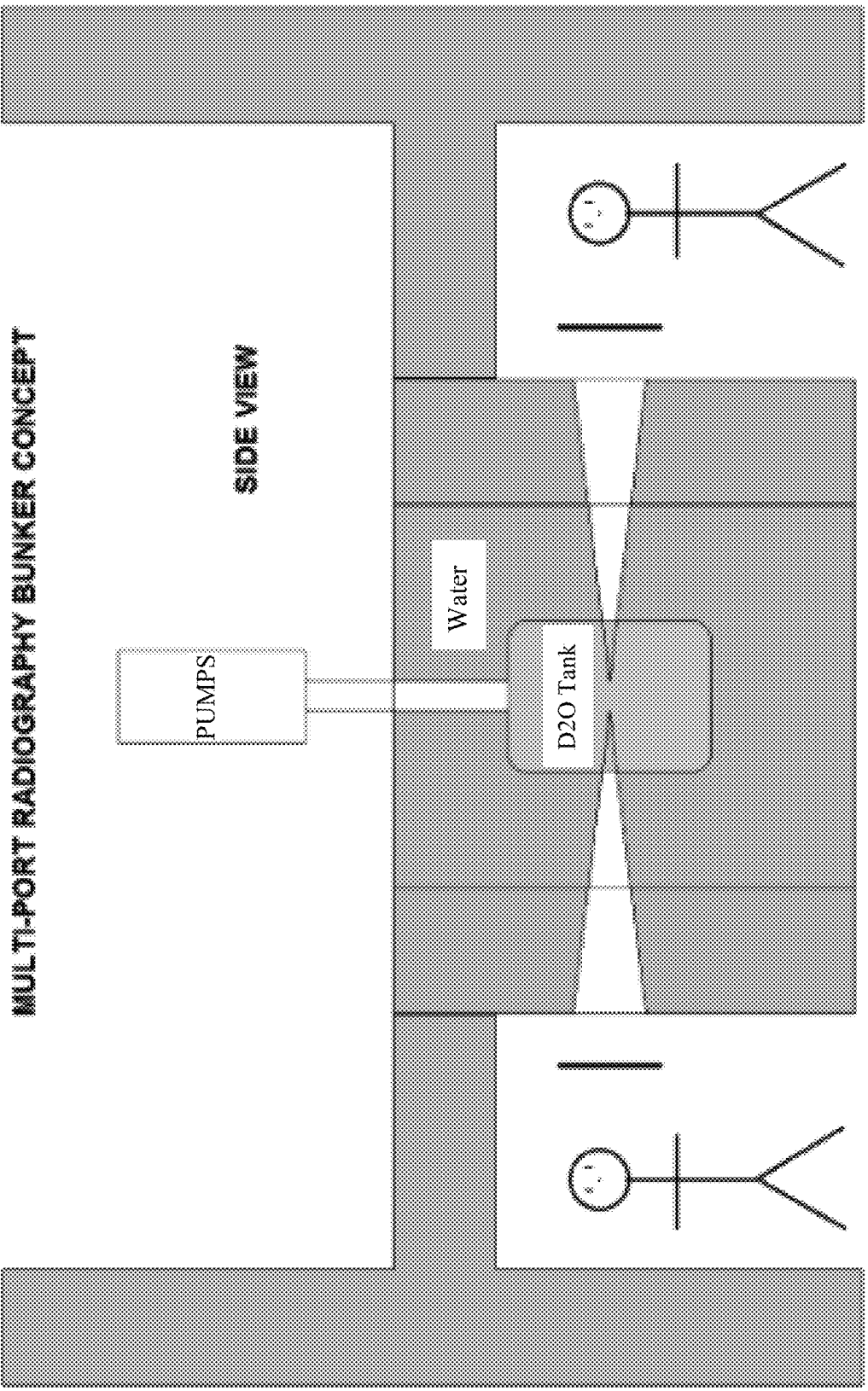

NEUTRON IMAGING SYSTEMS AND METHODS

The present application claims priority to U.S. Provisional application Ser. No. 62/655,928 filed Apr. 11, 2018, which is herein incorporated by reference in its entirety.

FIELD

Provided herein are neutron imaging systems (e.g., radiography and tomography) and methods that provide, for example, high-quality, high throughput 2D and 3D fast or thermal neutron images. Such systems and methods find use for the commercial-scale imaging of industrial components. In certain embodiments, provided herein are system comprising a plurality of independent neutron absorber-lined collimators (e.g., 4 or more collimators) extending outwards from a central neutron source assembly.

BACKGROUND

Neutron radiography and tomography are proven techniques for the nondestructive testing and quality control of manufactured components in the aerospace, energy, automotive, defense, and other sectors. Like X-rays, when neutrons pass through an object, they provide information about the internal structure of that object. Neutrons are able to easily pass through many high density materials and provide detailed information about internal materials, including many low density materials. This property is extremely important for a number of components that require nondestructive evaluation including jet engine turbine blades, munitions, aircraft and spacecraft components, and composite materials.

Historically, neutron radiography has primarily been performed commercially utilizing nuclear reactors as the neutron source. Nuclear reactors are expensive, difficult to regulate, and are becoming increasingly more difficult to access, making this powerful inspection technique impractical for many commercial applications. Neutrons can also be produced by nuclear reactions with ion beam accelerators, but to date such systems have either been too large and expensive for commercial users (for example the one billion+ dollar Spallation Neutron Source) or have low neutron output, requiring extremely long image acquisition times, which are not practical in production settings. Furthermore, nuclear reactors only provide beams of thermal neutrons, which are suitable for imaging components only up to a few inches thick. Fast neutron imaging of larger components has been demonstrated in R&D settings but has not been effectively implemented on a large scale commercial basis due to the lack of suitable fast neutron sources and detectors.

SUMMARY

In some embodiments provided herein are compact neutron imaging systems comprising: a) a central neutron source assembly configured to produce source neutrons, wherein the central neutron source comprises a solid or gas target, b) a moderator assembly surrounding the central neutron source, and c) a plurality of independent neutron absorber-lined collimators extending outwards from the central neutron source assembly, wherein each of the independent neutron absorber-lined collimators is configured to collect a portion of the source neutrons and produce a thermal neutron imaging beam line.

In particular embodiments, provided herein are compact multi-modality imaging systems comprising: a) a central neutron source assembly, b) multiple neutron imaging stations, and c) one or more additional nondestructive evaluation stations. In certain embodiments, the at least one additional nondestructive evaluation stations provides x-ray imaging. In other embodiments, the at least one of the additional nondestructive evaluation stations provides ultrasound detection. In further embodiments, one of the additional nondestructive evaluation stations provides magnetic resonance detection. In certain embodiments, one of the additional nondestructive evaluation stations provides magnetic penetrance. In particular embodiments, one of the additional nondestructive evaluation stations provides x-ray fluorescence. In other embodiments, one of the additional nondestructive evaluation stations provides thermography.

In some embodiments, provided here are methods of neutron imaging of an object comprising: a) positioning an object in front of a neutron imaging detector, and b) generating a thermal neutron imaging beam with any of the systems described herein, such that the thermal neutron imaging beam passes through at least a portion of the object thereby generating a neutron image that is collected by the neutron imaging detector. In certain embodiments, the object is an airplane part (e.g., wings), airplane engine, munition, a product that utilizes energetic materials, a fuse, rocket, a chemically activated device, a spacecraft part a wind turbine component (e.g., a composite part),or an aerospace part. In further embodiments, the methods further comprise a step prior to step a) of moving any of the systems described herein at least 1 mile, at least 20 miles, or at least 100 miles (e.g., at least 1 . . . 15 . . . 35 . . . 70 . . . 100 . . . or 1000 miles) from a first location to a second location. In other embodiments, the first location is a storage facility and the second location is a manufacturing or maintenance facility. In other embodiments, the manufacturing facility is an aerospace, munition, wind turbine, or airplane engine manufacturing facility and/or wherein the maintenance facility is an aerospace, munition, wind turbine, or airplane maintenance facility.

In some embodiments, provided herein are methods of imaging comprising: a) generating multiple neutron images of the same or separate objects employing the multiple neutron imaging stations, and b) generating at least one additional image of object with the one or more additional non-destructive evaluation stations. In further embodiments, the at least two additional images of the object are generated from multiple nondestructive evaluation modalities, wherein the at least two additional images are combined to generate fusion image data set.

In further embodiments, provided herein are compact neutron imaging systems comprising: a) a central neutron source assembly configured to produce source neutrons, wherein the central neutron source comprises a solid or gas target, b) a moderator/multiplier assembly, c) one or more thermal neutron collimators that extend outward from the moderator/multiplier assembly, wherein each of the thermal neutron collimators is configured to collect a portion of the source neutrons and produce a thermal neutron imaging beam line, and d) one or more fast neutron guides that extend outward from the moderator/multiplier assembly configured to collect a portion of the source neutrons and produce a fast neutron imaging beam line.

In certain embodiments, the central neutron source utilizes a deuterium-deuterium (DD) fusion reaction to generate the source neutrons. In particular embodiments, the central neutron source utilizes a deuterium-tritium (DT)

fusion reaction to generate the source neutrons. In other embodiments, the central neutron source utilizes a proton-Be reaction to generate the source neutrons. In further embodiments, the central neutron source utilizes a proton-Li reaction to generate the neutrons. In other embodiments, the central neutron source assembly comprises a linear particle accelerator for generating neutrons from the solid or gas target. In additional embodiments, the central neutron source assembly comprises a cyclotron for generating the source neutrons from the solid or gas target.

In further embodiments, the central neutron assembly comprises a moderator assembly surrounding at least part of the solid or gas target, wherein the moderator assembly is configured to allow low gamma production (e.g., using heavy water, high purity graphite, etc.) to increase neutron to gamma ratios at the exit of the collimators. In additional embodiments, the systems herein further comprise a multiplier assembly to provide for additional source neutrons. In certain embodiments, some or all of the collimators are directed at the moderator assembly. In other embodiments, some or all of collimators are directed at the neutron-producing target. In additional embodiments, the moderator assembly is further augmented by a neutron reflector to increase neutron flux at the entrance to some or all of the collimators. In certain embodiments, this reflector fully surrounds the moderator assembly, or partially surrounds it. In additional embodiments, the systems herein further comprise: a robotic motion component to allow for multi-image acquisition sequences to generate 3-dimentional tomographic image data sets.

In some embodiments, the systems herein further comprise: d) a neutron imaging detector, wherein the neutron imaging detector comprising a detector medium and an imaging plane. In certain embodiments, the systems herein further comprise: e) neutron focusing and/or reflecting elements which are configured to increase neutron flux at the imaging plane. In other embodiments, the neutron focusing and/or reflecting elements are configured to increase image resolution at the imaging plane. In certain embodiments, the detector medium comprises film, a scintillating conversion mechanism, or a digital neutron imaging detector.

In certain embodiments, the plurality of independent neutron absorber-lined collimators comprises at least three independent neutron absorber-lined collimators (e.g., 3, 4, 5, 6, or 7). In further embodiments, the plurality of independent neutron absorber-lined collimators comprises at least eight independent neutron absorber-lined collimators (e.g., 8 . . . 12 . . . 20 . . . or more). In further embodiments, the plurality of independent neutron absorber-lined collimators are all in, or about in, the same plane. In additional embodiments, the plurality of independent neutron absorber-lined collimators are not in the same plane. In certain embodiments, the systems herein further comprise: at least one fast neutron collimator (e.g., 1, 2, 3, 4, 5, 6, 7 . . . 10 . . . 15 . . . 20 or more). In certain embodiments, the neutron absorbing material is selected from the group consisting of: cadmium, boron and boron-containing compounds, lithium and lithium-containing compounds, gadolinium, composites containing any of the previous recited materials (e.g., such as a boron carbide powder in an epoxy matrix).

In some embodiments, provided herein are methods of neutron imaging of an object comprising: a) positioning an object in front of a neutron imaging detector, and b) generating a thermal neutron imaging beam, and/or generating a fast neutron imaging beam, with any of the systems herein, such that the thermal neutron imaging beam, and/or the fast neutron imaging beam, passes through at least a portion of the object thereby generating a neutron image that is collected by the neutron imaging detector.

In other embodiments, the systems herein further comprise: an automated object movement system configured to: i) insert and remove objects to be imaged, ii) and/or imaging media (e.g., film or digital), wherein automated object movement system is further configured to allow these items to be exchanged without exposing humans to an irradiation area.

In particular embodiments, any of the systems herein further comprise a shielding assembly surrounding at least part of the thermal neutron collimators. In other embodiments, any of the systems herein further comprise a bunker (e.g., wherein a shielding assembly is integrated into the bunker).

In some embodiments, provided herein are systems comprising: a) a collimator, wherein the collimator comprises an opening for collecting thermal neutrons; and b) a thermal neutron trap/diffuser positioned at the opening of the collimator, wherein the thermal neutron trap/diffuser comprises a hollowed section to promote migration of thermal neutrons towards the opening of the collimator and a solid section made from effective moderating material to ensure continued moderation of a bulk neutron source. This thermal neutron trap may be tapered at the same or similar slops as a conical or pyramidal collimator, straight (as in cylindrical or rectangular), or "inverted" such that the thermal trap grows larger as it moves towards the source of the thermal neutrons. In some embodiments, the collimator has a variable diameter or length that allows for the length-to-diameter ratio (L/D) to be varied, resulting in variable image resolution and image capture time. In particular embodiments, the systems herein further comprise a bulk neutron source.

In additional embodiments, provided herein are systems comprising: a non-planar neutron detector that conforms to the contour of a test specimen to minimize the blurring effect from a non-parallel neutron beam. In some embodiments, the non-planar neutron detector comprises a detector medium. In additional embodiments, the detector medium comprises film, a scintillating conversion mechanism, or a digital detector.

In certain embodiments, the systems herein further comprise fiber optic cables, and wherein the non-planar neutron detector comprises a primary detector and a digital detection and conversion system, and wherein the fiber optic cables are configured to transmit the light signal from the primary detector to a digital detection and conversion system. In other embodiments, polarizers such as sapphire are used to obtain a more horizontal beam of neutrons. This polarizer can be readily positioned into or out of the beam path to adjust image parameters.

In certain embodiments, provided herein are compact neutron imaging system comprising: a) a central neutron source assembly, b) a moderator/multiplier assembly, c) one or more thermal neutron collimators that extend outward from the moderator/multiplier assembly, and d) one or more fast neutron guides that extend outward from moderator/multiplier assembly.

Provided herein, in certain embodiments, are neutron radiography and tomography systems and methods that provide high-quality, high throughput fast or thermal neutron images. Such systems provide viable commercial-scale thermal and fast neutron radiography. Multiple performance enhancing technologies are described herein that individually and collectively contribute to the high-throughput and high resolution neutron imaging capabilities. It should be understood that unless expressly stated otherwise or contrary to logic each of the technologies described herein may be used in combination with each other to provide imaging capabilities with desirable performance features and characteristics.

In addition, in some instances, the described neutron imaging technologies may also be combined with other nondestructive evaluation techniques, including x-ray radiography and tomography, to create fusion image data sets that provide more information than a standalone neutron or x-ray image would have on its own. Other nondestructive evaluation techniques that provide 2D and 3D information about a component that may be fused with the neutron image include ultrasound, magnetic resonance, magnetic penetrant, thermography, x-ray fluorescence, and small angle neutron scattering, amongst others. In such cases, image registration software may be used to correlate data from two or more nondestructive evaluation techniques to create a fusion image data set.

Individually or collectively these technologies may be applied to, for example, any non-reactor source of high energy neutrons. Embodiments of the technology may be employed with high energy ion beam generator systems such as those described in, U.S. Pat. Publ. No. 2011/0096887, 2012/0300890, and 2016/0163495 and U.S. Pat. Nos. 8,837,662 and 9,024,261, all of which are herein incorporated by reference in their entireties. In other cases, a higher energy ion-accelerator-based neutron source will be used to illustrate embodiments of the technology. However, it should be understood that these technologies may be applied to a wide range of high energy neutron generating technologies, including high energy electron and ion accelerators (e.g., deuteron or triton accelerators).

In certain embodiments, the fast neutron source is partially surrounded by multiplying and moderating material and thermal and fast neutron collimators, such that fast neutrons are able to freely stream only in desired directions while also maintaining a thermal neutron population that can be used for imaging in other directions. In other embodiments the fast neutron source is partially surrounded by multiplying and moderating material to provide a thermal neutron source that feeds multiple collimator ports simultaneously to increase imaging throughput. In other embodiments, a multi-modality imaging capability is integrated with the fast and/or thermal neutron imaging system.

In certain embodiments, the multiplicity of neutron collimator beam ports are positioned to be in a continuous or nearly continuous ring extending outwards from the vicinity of the central neutron source. This would provide for a circumferential imaging plane that is continuous or nearly continuous such that very large items could be imaged faster and with less total exposure.

BRIEF DESCRIPTION OF THE DRAWINGS

FIG. 3A-FIG. 3B shows an exemplary schematic of an imaging system with multiple radial thermal neutron beam collimators integrated into a bunker facility shielding.

DETAILED DESCRIPTION

Neutron radiography and tomography are proven techniques for the nondestructive testing of manufactured components in the aerospace, energy, automotive, defense, and other sectors. It is presently underutilized because of a lack of accessible, high flux neutron sources with the appropriate spectral characteristics. Just like X-rays, when neutrons pass through an object, they provide information about the internal structure of that object. X-rays interact weakly with low atomic number elements (e.g. hydrogen) and strongly with high atomic number elements (e.g. many metals). Consequently, their ability to provide information about low-density materials, in particular when in the presence of higher density materials, is poor. Neutrons do not suffer from this limitation. They are able to pass easily through high density metals and provide detailed information about internal materials, including low density materials. This property is extremely important for a number of components that require nondestructive evaluation including engine turbine blades, munitions, spacecraft components, and composite materials such as certain aerospace components and wind turbine blades. For all of these applications, neutron imaging provides definitive information that X-rays and other nondestructive evaluation modalities cannot.

U.S. Pat. Publ. No. 2011/0096887, 2012/0300890, and 2016/0163495 and U.S. Pat. Nos. 8,837,662 and 9,024,261 provide many varieties of accelerator-based neutron sources that can be coupled to neutron moderators, collimators, guides, mirrors, lenses, and neutron-detecting medium to provide a neutron radiography system that can be used as the source of neutrons for the systems and methods described herein. When a moderator (and optional multiplier) section is included and the neutron guide is lined with thermal neutron absorbing material, the system can be used for thermal neutron imaging (e.g., radiography). Affordable accelerator-based neutron sources provide several orders of magnitude lower source neutrons than a typical neutron radiography facility, e.g. a nuclear reactor. Therefore, the neutron-detecting medium should be in close proximity to the neutron source. Conversely, at a nuclear reactor or large spallation source, it is typical that the detection medium can be several meters away from the neutron source, allowing for space in which to place filters to mitigate undesirable types of radiation, mainly stray gamma rays and fast neutrons, which will partially blur the image during acquisition.

Figure 1A:
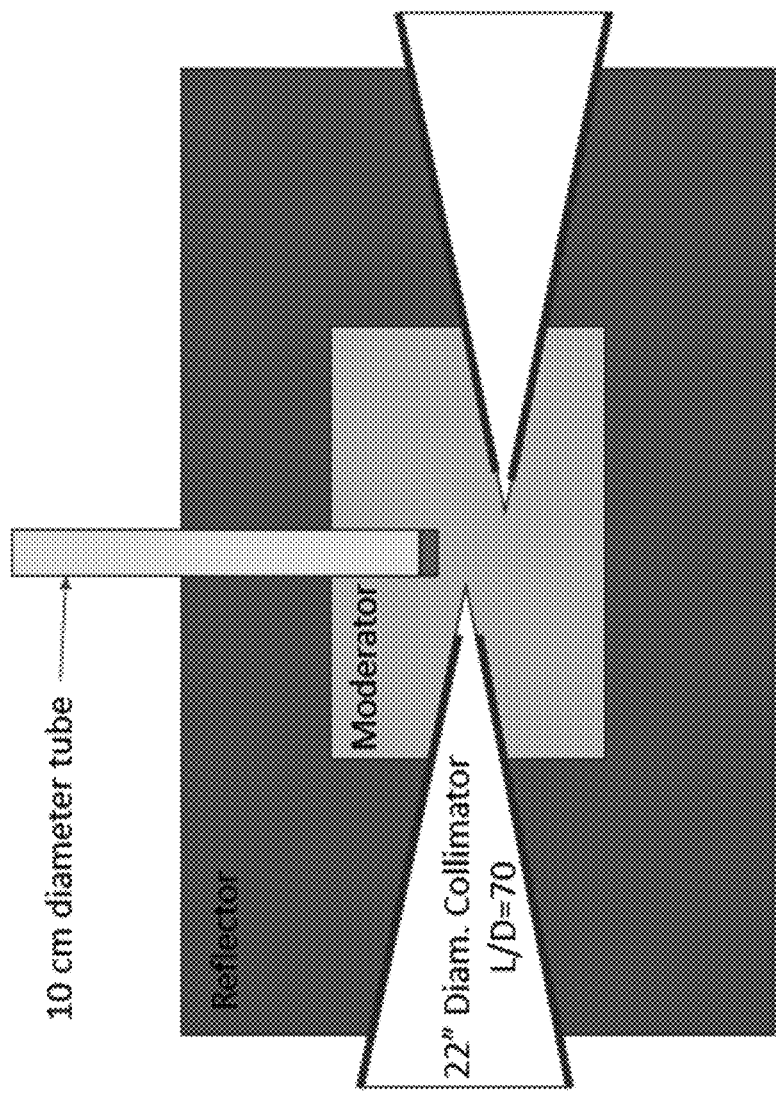
FIG. 1A shows an exemplary schematic of a beam generating system with a central neutron source (e.g., central fast neutron source), moderator assembly, and multiple radial thermal neutron beam ports.
Figure 1B:
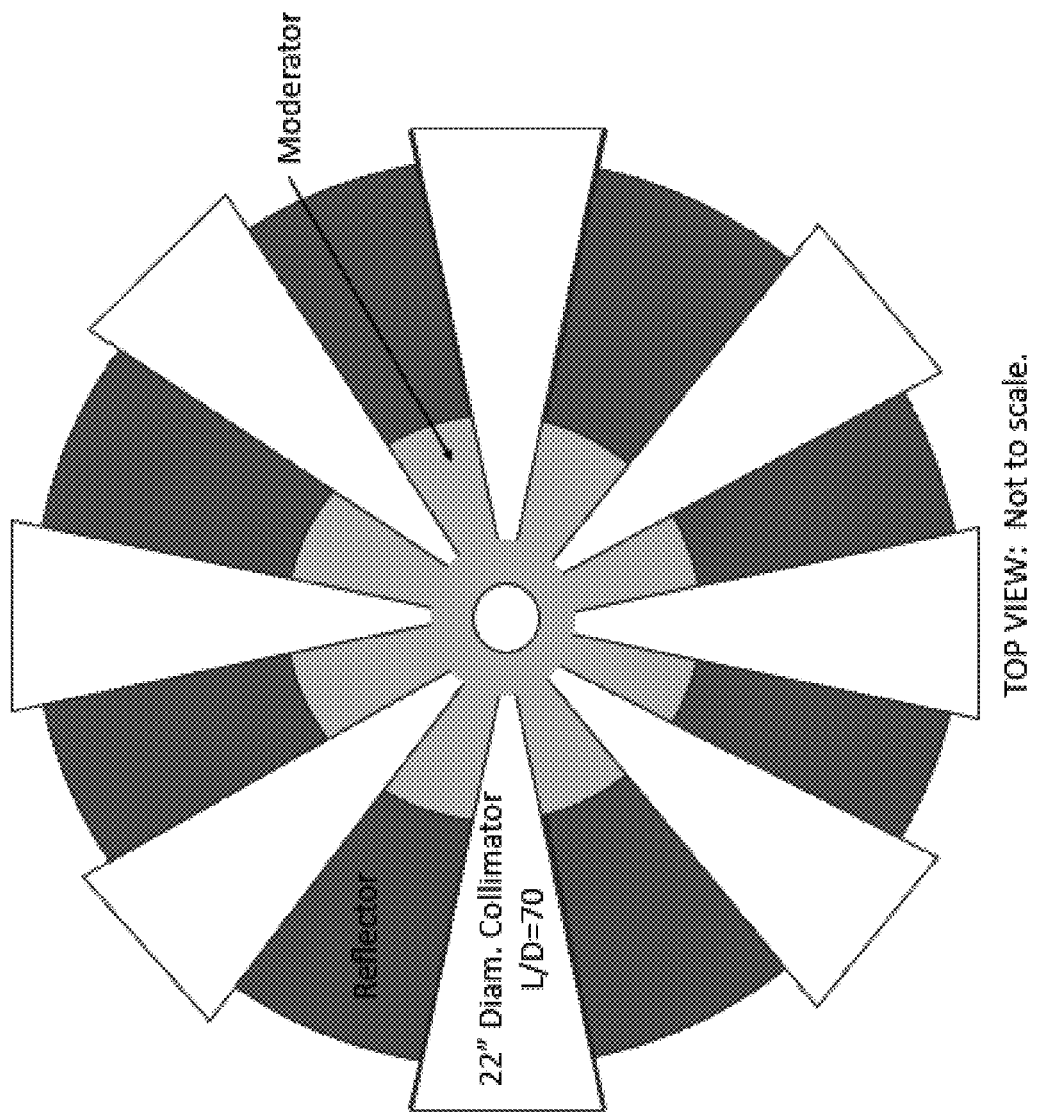
FIG. 1B shows an exemplary schematic with multiple ion beam lines from a single particle accelerator, with each ion beam line coupled to one or more fast or thermal neutron beam ports.
Figure 2:
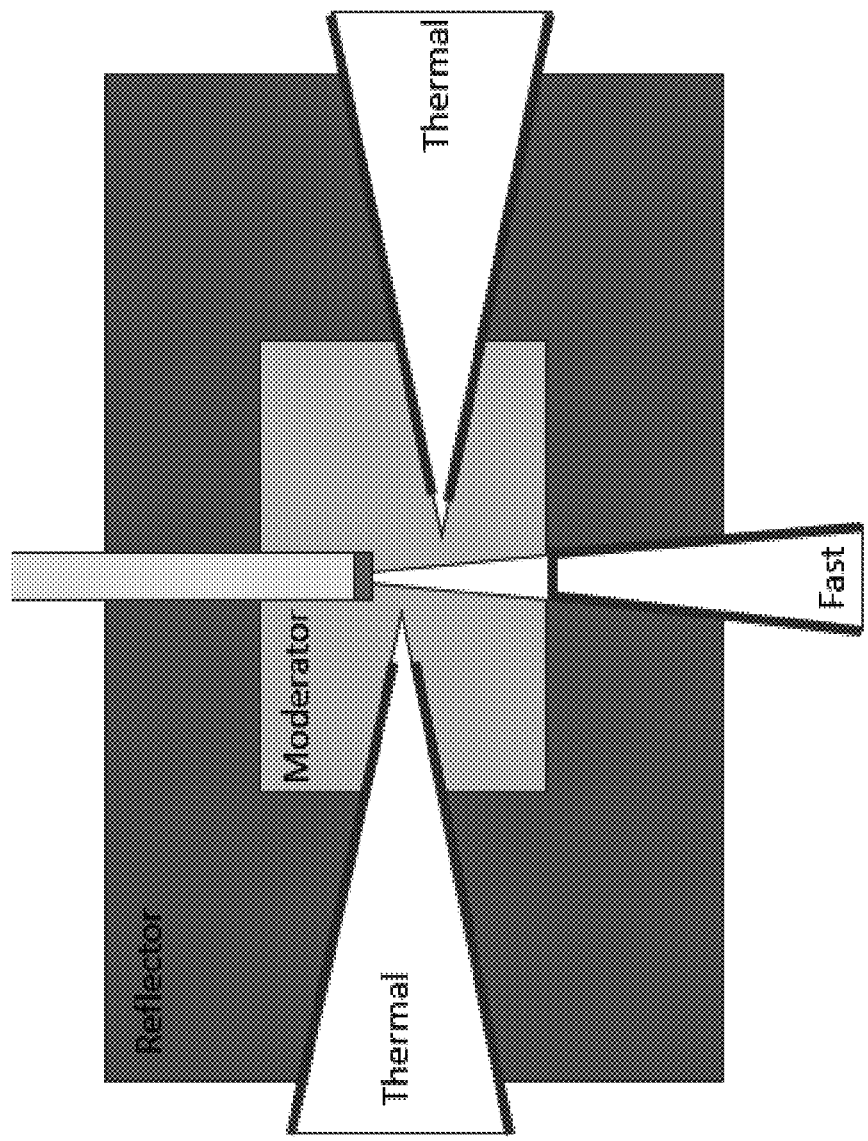
FIG. 2 shows an exemplary beam generating system with multiple radial thermal neutron beam collimator and one forward-directed fast neutron beam port.

For a compact accelerator system (e.g., as shown in U.S. Pat. Publ. No. 2011/0096887, 2012/0300890, and 2016/0163495 and U.S. Pat. Nos. 8,837,662 and 9,024,261) to economically meet the demands of a commercial radiography application, new concepts and strategies need to be employed. Provided herein are compact neutron imaging (e.g., radiography) systems that provides a moderator assembly (and optionally a multiplier) coupled to multiple fast and thermal imaging ports that can be used simultaneously. An exemplary configuration is shown in FIG. 1. This configuration provides up to roughly a 10-fold increase in throughput capability for a given neutron source. An alternative configuration reduces the amount of gamma production from neutron absorption. This configuration utilizes heavy water as the primary moderator, allowing for a much higher neutron to gamma ratio at the imaging plane. Further, when a forward-peaked source of fast neutrons is utilized, a modified version of this multi-beam moderator assembly provides for one or more forward-looking fast neutron ports in addition to one or more thermal neutron collimators. An exemplary configuration is shown in FIG. 2. In each of these configurations involving a thermal imaging beam line, the system utilizes moderators with minimal thermal neutron capture cross sections to maintain maximum thermal neutron flux and minimal gamma flux resulting from captured neutrons (2.2 MeV hydrogen capture gammas, for example). This dramatically improves the image quality that is achieved by such a system.

Figure 3B:
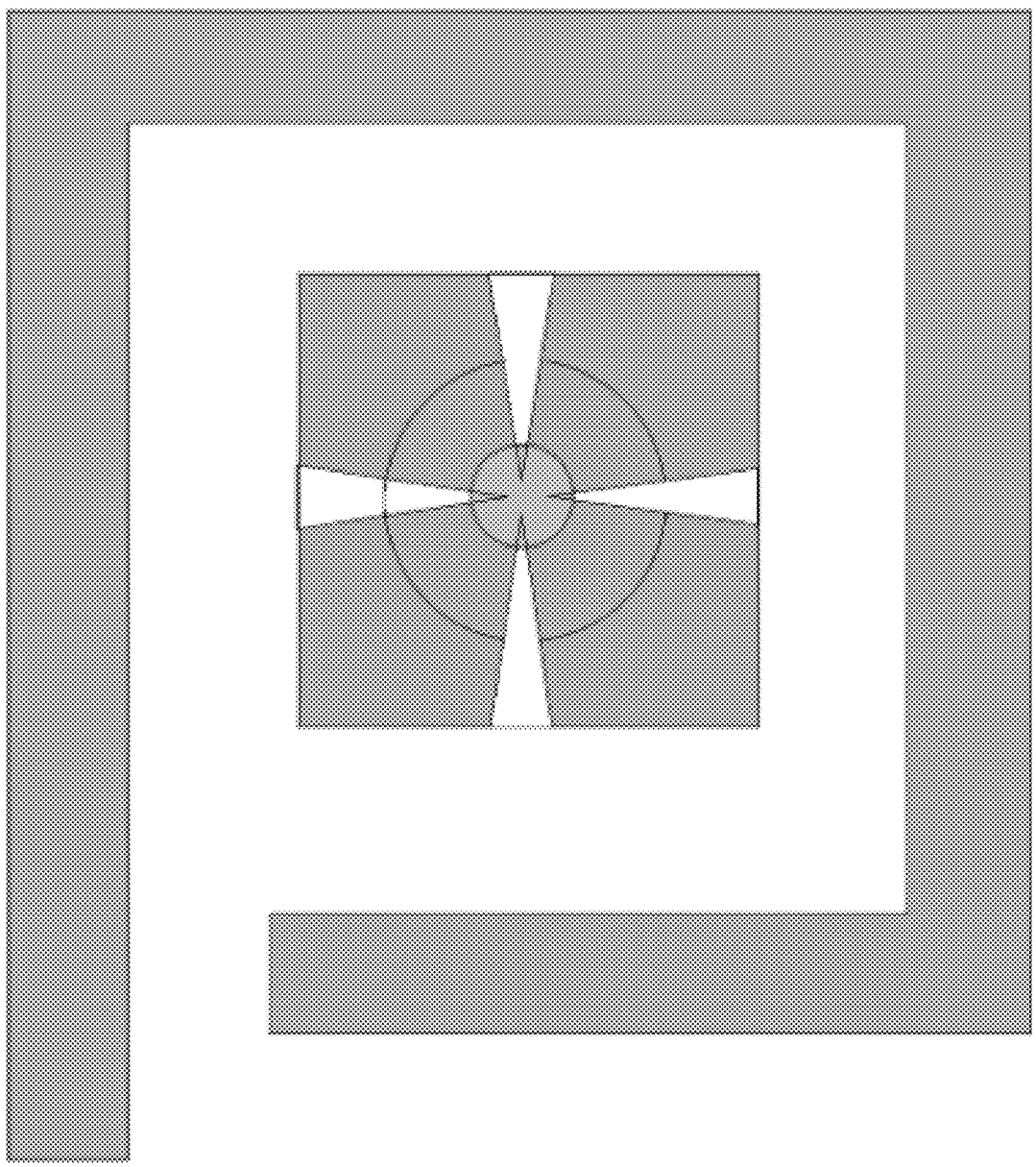

During operation, in general, on the outside of the neutron collimators, there is a large neutron population comprised of a spectrum of energies between 0 and 100 MeV. For thermal neutron imaging, it is the lower energy neutrons that are used in the imaging process and so it is desirable to decrease the energy of the neutrons (e.g., as much as possible). However, these lower energy neutrons are more likely to produce subsequent gamma rays when absorbed by surrounding materials, as in the case of the cadmium. Low-energy neutrons cause these gamma production events whether they are inside or outside of the neutron collimator. Since it is only the neutrons inside the collimator that are useful for the image acquisition, the neutrons outside the collimator guide should be absorbed as well. Provided herein are embodiments that provide a cost-effective strategy to minimize image contamination from these stray neutrons and gammas. In certain embodiments, this involves the incorporation of the facility shielding directly into one or more collimator assemblies, reducing cost and footprint while maximizing effectiveness of the overall system. An exemplary configuration is shown in FIG. 3.

Figure 4:
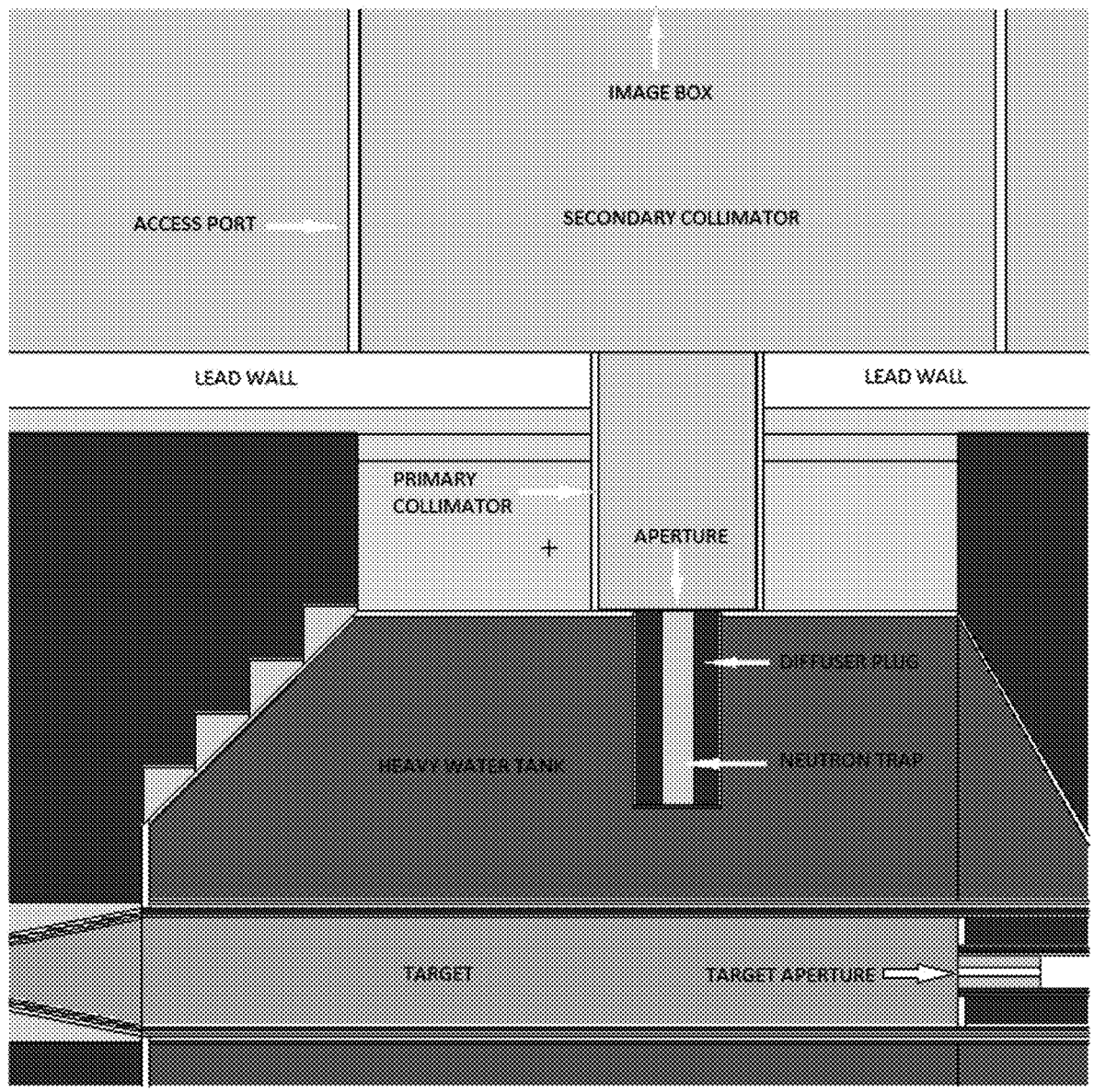
FIG. 4 shows an exemplary schematic of a thermal neutron diffuser system.

Further, in any of these configurations involving a thermal neutron imaging line, a diffusion region comprised of air or other gases can be employed to allow for relatively the same optical path length for thermal neutrons to enter the aperture of the collimator, while increasing the distance that fast neutrons must traverse before entering. In some embodiments, the air diffusion region is 4-8 cm long (e.g., 4.0 . . . 5.0 . . . 6.0 . . . 7.0 . . . or 8.0 cm) and 1.5 to 4.0 cm (e.g., 1.5 . . . 2.5 . . . 3.5 . . . 4.0 cm) in diameter. This longer path length for fast neutrons allows them more opportunities to scatter in the moderating medium and thus be slowed to lower energies. The diffusion region may be composed of materials such as water, high density polyethylene (HDPE), and graphite, for example. Materials that produce fewer capture gammas that will subsequently diminish the image quality are generally preferred. An exemplary configuration is shown in FIG. 4.

Figure 5:
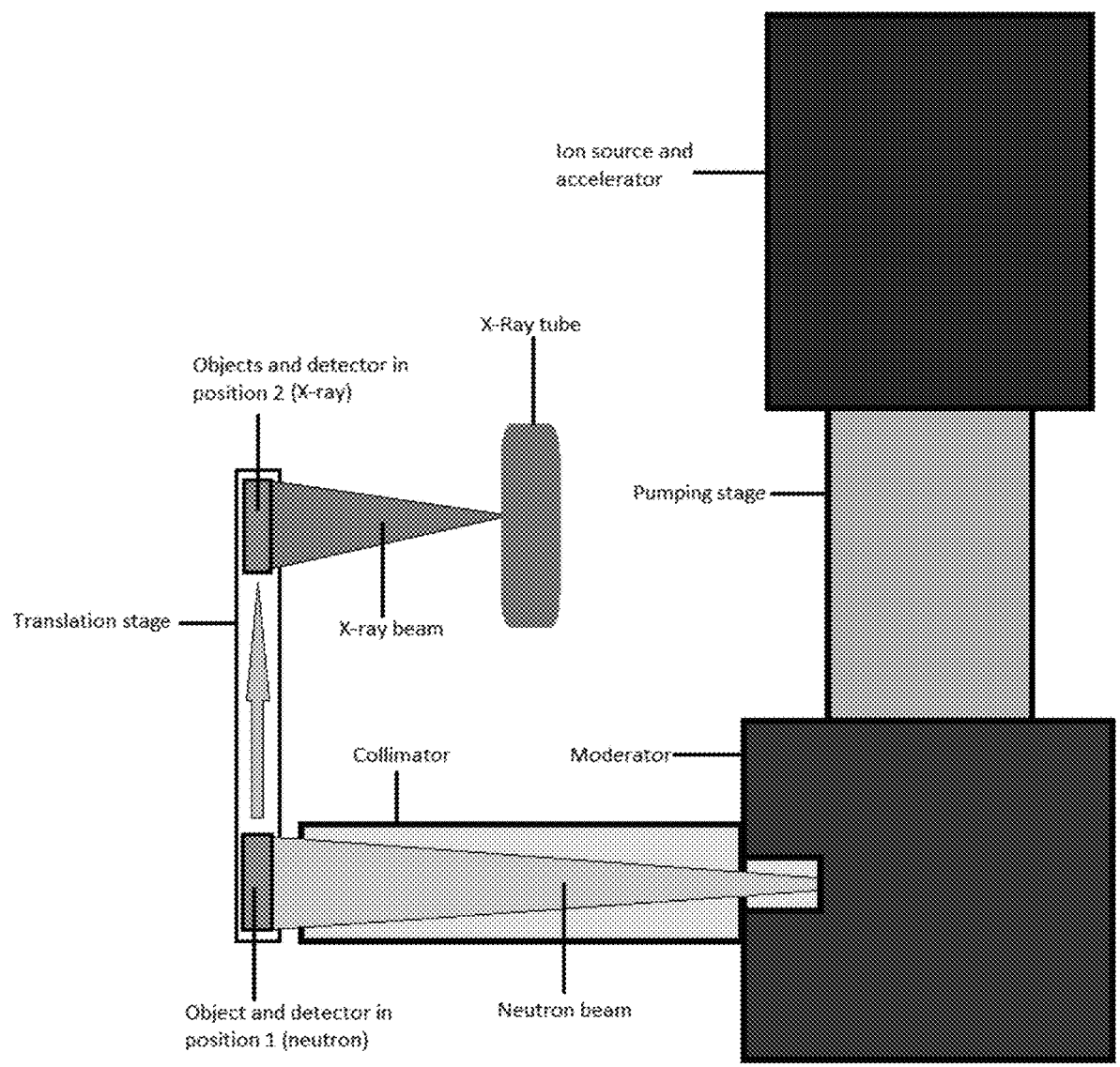
FIG. 5 shows an exemplary neutron imaging system combined with an x-ray imaging system for multi-modality fusion imaging.

In some embodiments, one or more additional nondestructive imaging modalities are integrated into the neutron imaging system (e.g., such as x-ray radiography or tomography). In such instances, the 3D spatial coordinates of the test object are known and controlled during the course of multiple image acquisitions with different modalities. Subsequent to the multi-modality image acquisition process, image registration software is utilized to fuse images from different imaging modalities creating a fusion image. In some instances, fiducial markers may be placed on the component to allow for rapid image registration across multiple inspection modalities. An exemplary configuration is shown in FIG. 5.

Figure 6:
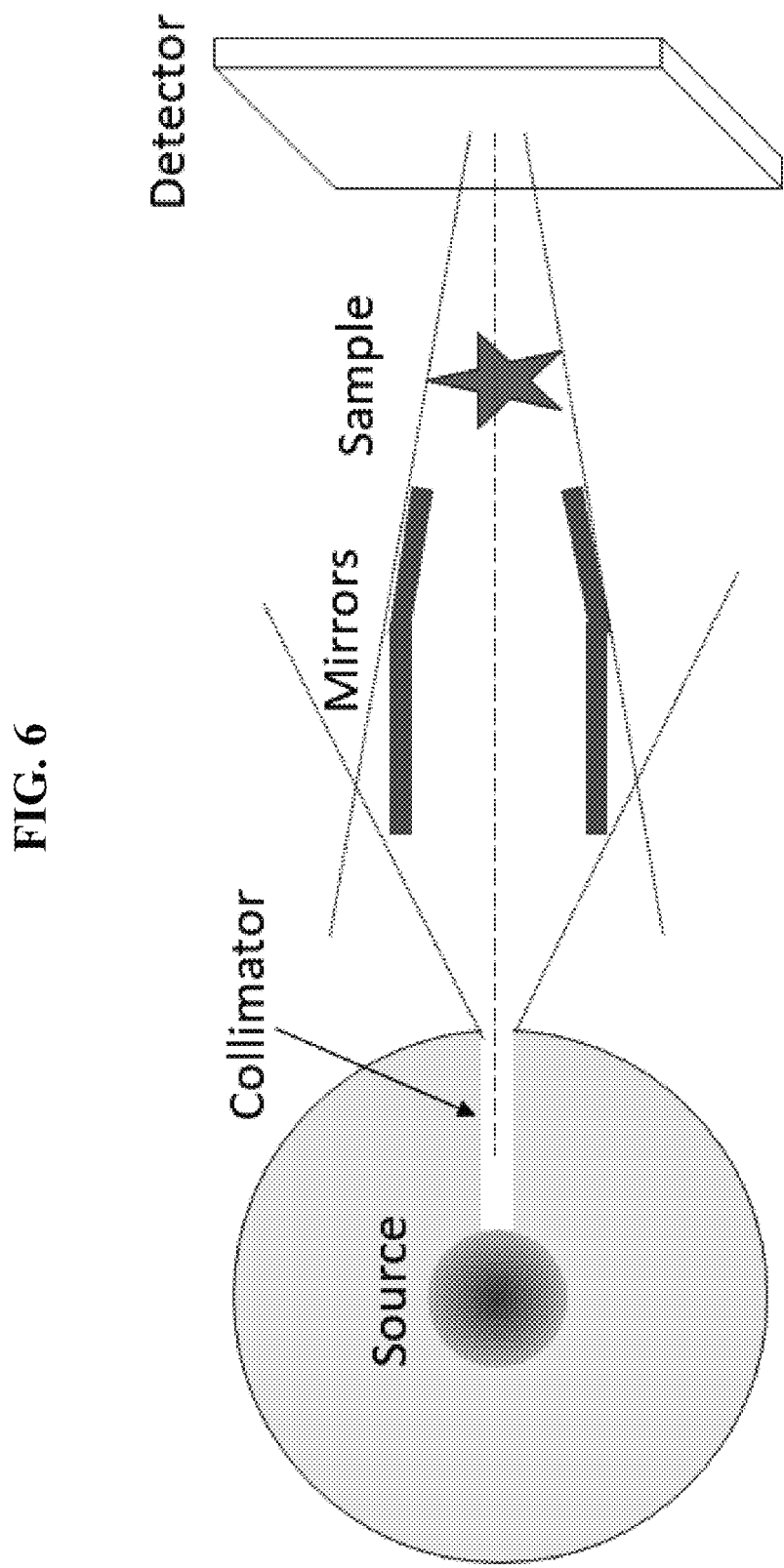
FIG. 6 shows an exemplary high throughput neutron imaging system incorporating neutron-reflecting and neutron-focusing elements such as mirrors and guides.

In some embodiments, one or more neutron focusing or reflecting elements (e.g., lenses, mirrors, guide tubes) may be incorporated to increase the flux and/or resolution of the neutron beam at the imaging plane. An exemplary configuration is shown in FIG. 6. In certain embodiments, other components are employed to cool neutrons, such a cooling material that the neutrons are passed through (e.g., liquid hydrogen ions, helium ions, or nitrogen ions).

Figure 7:
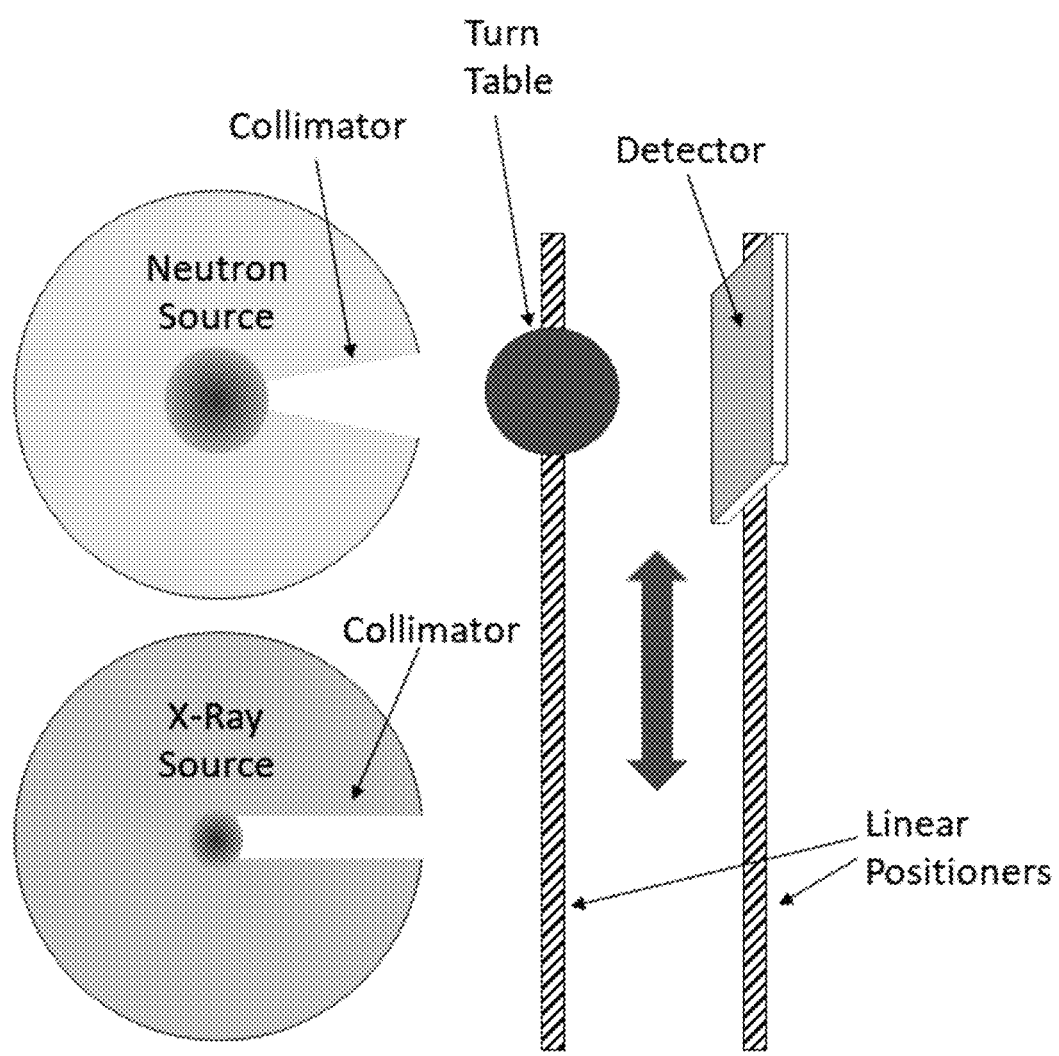
FIG. 7 shows an exemplary multi-port thermal and fast neutron imaging system with multiple turn tables for parallel acquisition of multi-view images to generate 3D tomographic data sets for multiple components simultaneously.
Figure 8:
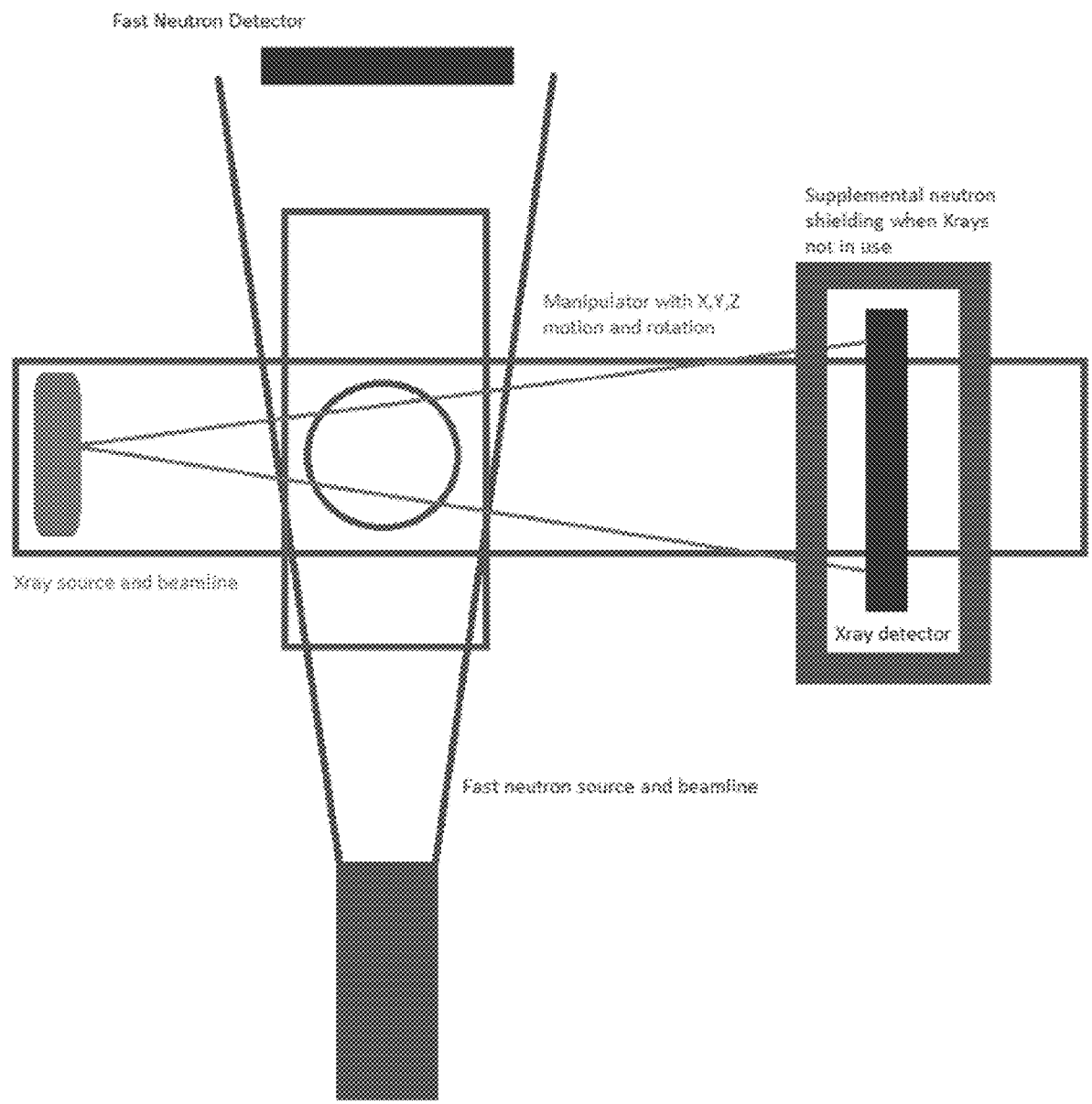
FIG. 8 shows an exemplary dual X-ray and fast neutron CT imaging system that combines the two techniques utilizing the same manipulator and rotational stage.

In some embodiments, the radiation source, detector, and/or test specimen may be in motion during or between multi-image acquisition sequences from multiple angles to generate 3D tomographic image data sets. High precision robotic control may be utilized for such motion. Image data sets may be obtained with multiple imaging modalities utilizing two to several thousand distinct planar 2D images which combine to generate a 3D data set for each imaging modality. An exemplary configuration is shown in FIG. 7.

Figure 9:
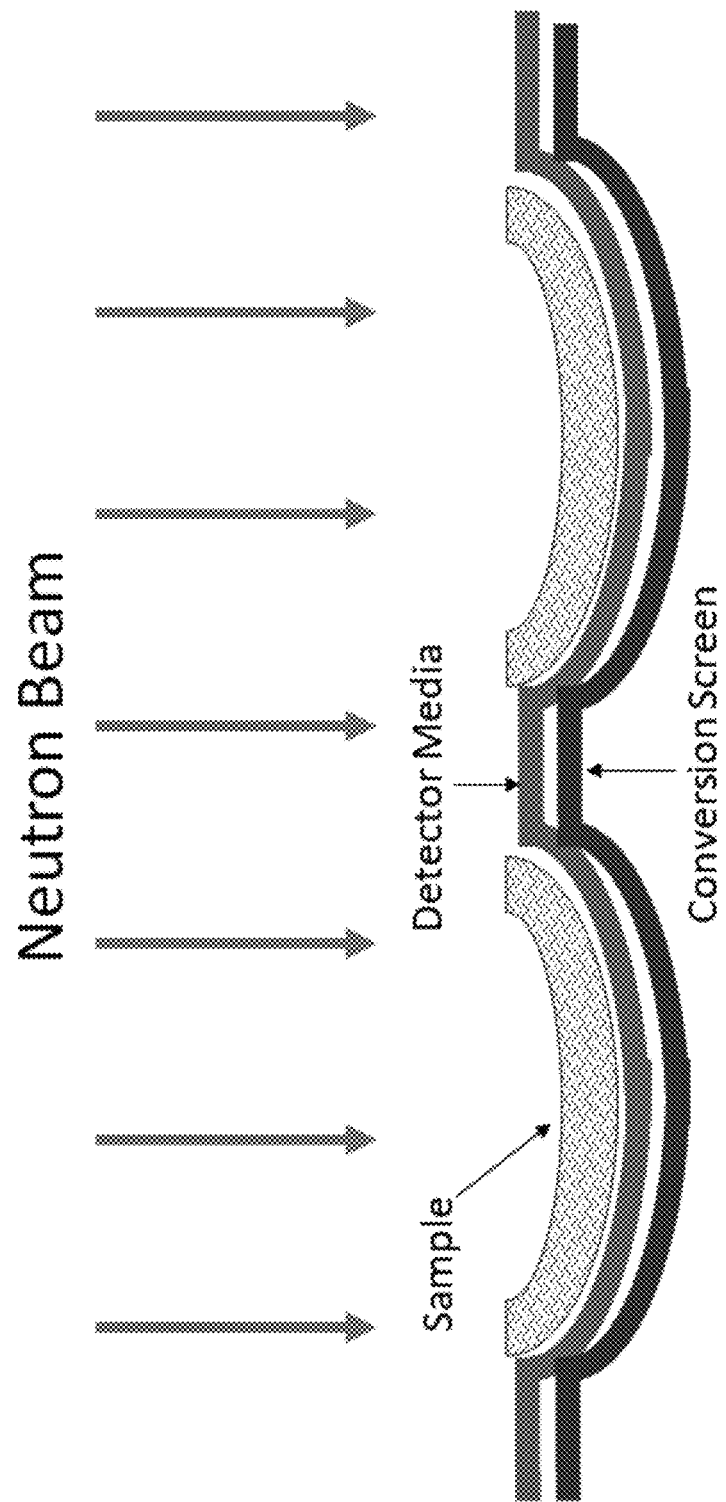
FIG. 9 shows an exemplary non-planer digital detector array that minimizes the neutron travel distance between the test specimen and the detector such that the blurring effect from a non-parallel neutron beam is minimized.

In all of the described embodiments, one or more detector media may be used to detect the fast or thermal neutrons to generate 2D or 3D image data sets. Such detector media may include radiographic film, storage phosphors, scintillators, direct conversion screens, amorphous silicon flat panels, microchannel plates, digital detector arrays, and indirect conversion screens, amongst others. In some embodiments, the detector may be configured in a non-planar geometry such that the distance of neutron travel between the test specimen and the detector is minimized such that the blurring effect of a non-parallel neutron beam is minimized. In such instances, the non-planar detector could be composed of film or digital media, such as scintillating material coupled to light transmitting, converting, multiplying, and/or detector elements such as fiber optic guides and photomultiplier tubes. An exemplary configuration is shown in FIG. 9.

In some embodiments, the above described systems and methods are made available at the location of manufacture of the components to be imaged. This departs from imaging approaches today where the manufactured components are shipped to reactor sites, often at great cost and inconvenience. In some embodiments, an accelerator-based neutron system as described herein is housed at the manufacturing facility. In some such embodiments, the imaging data is integrated into the design and quality control and quality assurance systems of the manufacturing system. In some embodiments, one or more components of the accelerator-based neutron system as described herein is mobile (e.g., provided in mobile vehicle) and is made available at a manufacturing location as needed.

We claim:

1. A neutron imaging system comprising:
   a) a central neutron source assembly configured to produce source neutrons, wherein said central neutron source comprises a solid or gas target,
   b) a moderator assembly surrounding the central neutron source assembly,
   c) a plurality of independent neutron absorber-lined collimators extending outwards from said central neutron source assembly, wherein each of said independent neutron absorber-lined collimators is configured to collect a portion of said source neutrons and produce a thermal neutron imaging beam line; wherein said plurality of independent neutron absorber-lined collimators comprises at least three independent neutron absorber-lined collimators; and
   d) a neutron imaging detector, wherein said neutron imaging detector comprises a detector medium and an imaging plane.

2. The system of claim 1, wherein said central neutron source assembly comprises a linear particle accelerator or a cyclotron for generating neutrons from said solid or gas target.

3. The system of claim 1, wherein said moderator assembly surrounds at least part of said solid or gas target, wherein said moderator assembly is configured to increase neutron to gamma ratios at the exit of the collimators.

4. The system of claim 1, further comprising: e) a robotic motion component to allow for multi-image acquisition sequences to generate 3-dimensional tomographic image data sets.

5. The system of claim 1, further comprising: e) neutron focusing and/or reflecting elements which are configured to increase neutron flux at the imaging plane.

6. The system of claim 1, wherein the detector medium comprises: i) film, ii) a scintillating conversion mechanism, or a digital neutron imaging detector.

7. The system of claim 1, wherein said plurality of independent neutron absorber-lined collimators comprises at least nine independent neutron absorber-lined collimators.

8. The system of claim 1, wherein said plurality of independent neutron absorber-lined collimators are all in a plane that is the same.

9. The system of claim 1, wherein said plurality of independent neutron absorber-lined collimators are all in planes that are not the same.

10. The system of claim 1, further comprising: e) at least one fast neutron collimator.

11. A method of neutron imaging of an object comprising:
    a) positioning an object in front of a neutron imaging detector, and
    b) generating a thermal neutron imaging beam with the system of claim 1, such that said thermal neutron imaging beam passes through at least a portion of said object thereby generating a neutron image that is collected by said neutron imaging detector.

12. The method of claim 11, wherein said object is an airplane part, airplane engine, munition, a product that utilizes energetic materials, a fuse, rocket, a chemically activated device, a spacecraft part, a wind turbine component, or an aerospace part.

13. The method of claim 11, further comprising a step prior to step a) of moving said system of claim 1 at least 1 mile from a first location to a second location.

14. The method of claim 13, wherein said first location is a storage facility and said second location is a manufacturing or maintenance facility.

15. The system of claim 1, wherein each of the plurality of independent neutron absorber-lined collimators is conical.

16. The system of claim 1, wherein a length-to-diameter ratio of each of the plurality of the independent neutron absorber-lined collimators is 70.

17. A neutron imaging system comprising:
    a) a central neutron source assembly configured to produce source neutrons, wherein said central neutron source comprises a solid or gas target,
    b) a moderator/multiplier assembly,
    c) at least three thermal neutron collimators that extend outward from the moderator/multiplier assembly, wherein each of said thermal neutron collimators is configured to collect a portion of said source neutrons and produce a thermal neutron imaging beam line,
    d) one or more fast neutron guides that extend outward from said moderator/multiplier assembly configured to collect a portion of said source neutrons and produce a fast neutron imaging beam line;
    e) a neutron imaging detector, wherein said neutron imaging detector comprises a detector medium and an imaging plane; and
    f) a fast neutron detector.

18. The system of claim 17, further comprising an automated object movement system configured to: i) insert and remove objects to be imaged, ii) and/or imaging media, wherein automated object movement system is further configured to allow these items to be exchanged without exposing humans to an irradiation area.

19. A neutron imaging system comprising:
    a) a central neutron source assembly,
    b) a moderator/multiplier assembly,
    c) at least three thermal neutron collimators that extend outward from the moderator/multiplier assembly,
    d) one or more fast neutron guides that extend outward from said moderator/multiplier assembly;
    e) a neutron imaging detector, wherein said neutron imaging detector comprises a detector medium and an imaging plane, and
    f) a fast neutron detector.

20. The system of claim 19, wherein said fast neutron detector comprises a scintillator.

* * * * *